United States Patent [19]

Orr et al.

[11] Patent Number: 4,937,567
[45] Date of Patent: Jun. 26, 1990

[54] COMMUNICATION ADAPTER FOR STORE LOOP COMMUNICATION SYSTEM

[75] Inventors: Michael A. Orr, Raleigh, N.C.; Chester L. Storm, Hillsville, Va.; James M. White, Raleigh, N.C.

[73] Assignee: International Business Machines Corporation, Armonk, N.Y.

[21] Appl. No.: 14,176

[22] Filed: Feb. 12, 1987

Related U.S. Application Data

[63] Continuation of Ser. No. 669,157, Nov. 7, 1984, abandoned.

[51] Int. Cl.$^5$ ........................... H04Q 3/02; H04B 1/38
[52] U.S. Cl. ........................... 340/825.05; 340/825.06; 375/8
[58] Field of Search ..................... 375/8, 9; 364/200; 340/825.05, 825.06; 370/86-90, 85.5, 85.15

[56] References Cited

U.S. PATENT DOCUMENTS

| | | | |
|---|---|---|---|
| Re. 31,852 | 3/1985 | Soderblom | 370/90 |
| 3,764,977 | 10/1973 | Weeden, Jr. | 375/8 X |
| 3,937,882 | 2/1976 | Bingham | 179/2 D P X |
| 4,007,449 | 2/1977 | Vercesi | 375/8 X |
| 4,332,029 | 5/1982 | Campbell et al. | 375/8 X |
| 4,425,664 | 6/1984 | Sherman et al. | 375/8 |
| 4,529,979 | 7/1985 | Kusama et al. | 340/825.05 |

*Primary Examiner*—Ulysses Weldon
*Attorney, Agent, or Firm*—Joscelyn G. Cockburn

[57] ABSTRACT

An interface device called an adapter is provided for interconnecting data terminal equipment (DTE) to a communication highway. The adapter includes a plurality of command/status registers coupled through a decoding device to the data bus and control lines of a microprocessor. An Internal Modem Interface (IMI) circuit arrangement monitors the decoding device and command/status registers and depending on the contents of the command/status registers and/or the status of the signals on the interface the IMI enables/disables the receive and transmit logic functions of the adapter. The adapter also includes a circuit arrangement which monitors traffic or signals on the data highway without affecting the electrical characteristics of the traffic.

20 Claims, 10 Drawing Sheets

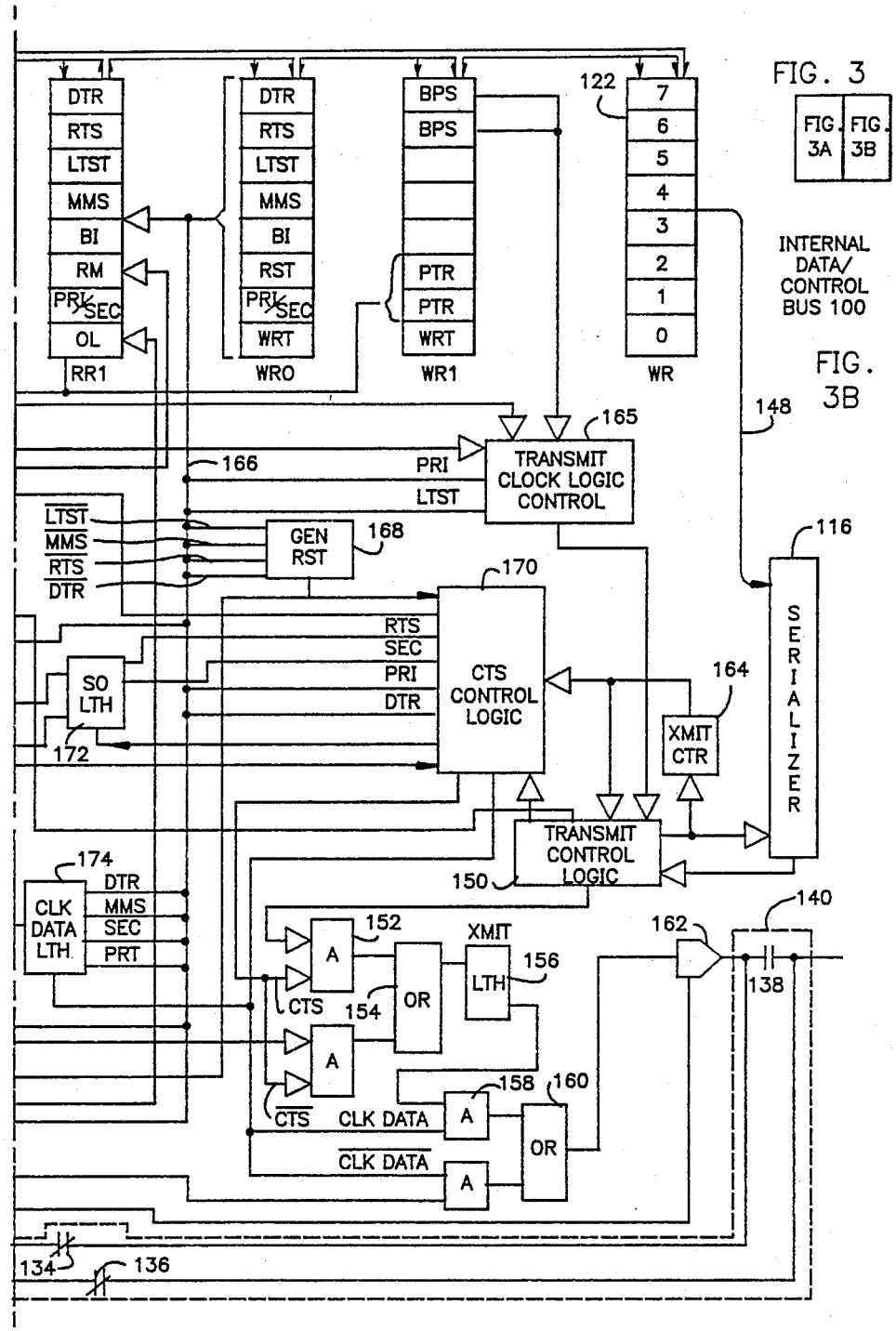

READ REGISTER 0 (RR0)

| DB | IF = 1 | IF = 0 | RX'ED FLAG | RX'ED EOP | RX'ED DATA |
|---|---|---|---|---|---|
| 7 | RECEIVE | – | 1 | 1 | 0 |
| 6 | INTERR. | – | 1 | 0 | 1 |
| 5 | INTERR. | – | SERIALIZER EMPTY | | |
| 4 | INTERR. | – | SERIALIZER/DESERIALIZER OVERRUN | | |
| 3 | INTERR. | – | RLSD DROPPED | | |
| 2 | ON | OFF | RLSD STATUS | | |
| 1 | ON | OFF | SHUTOFF INTERRUPT AND STATUS | | |
| 0 | ON | OFF | CTS STATUS | | |

FIG. 4

READ REGISTER 1 (RR1)

| DB | IF = 1 | IF = 0 | |
|---|---|---|---|
| 7 | ON | OFF | DATA TERMINAL READY |
| 6 | ON | OFF | REQUEST TO SEND |
| 5 | ON | OFF | LOCAL TEST |
| 4 | ON | OFF | MONITOR MODE |
| 3 | ON | OFF | 0 BIT INSERT |
| 2 | ON | OFF | RECEIVE MODE |
| 1 | PRIMARY | SEC. | PRIMARY/SECONDARY |
| 0 | ON | OFF | ON LINE |

FIG. 4A

READ REGISTER 2 (RR2)

| DB | IF = 1 | IF = 0 | | | | |
|---|---|---|---|---|---|---|
| 7 | DECODED | SHOWS | 0 | 0 | 1 | 1 |
| 6 | DATA | RATE | 0 | 1 | 0 | 1 |
| 5 | | | 38.4 KBAUD | 19.2 KBAUD | 9.6 KBAUD | 4.8 KBAUD |
| 4 | | | | | | |
| 3 | | | *WITH 14.7456 MHZ OSCILLATOR INPUT | | | |
| 2 | | | | | | |
| 1 | ON | OFF | LOOP DRIVER | | | |
| 0 | ON | OFF | CLOCK DRIVER | | | |

FIG. 4B

WRITE REGISTER 0 (WR0)

| DB | IF = 1 | IF = 0 | |
|---|---|---|---|
| 7 | SET | RESET | DATA TERMINAL READY (DTR) |
| 6 | SET | RESET | REQUEST TO SEND (RTS) |
| 5 | SET | RESET | LOCAL TEST (LTST) |
| 4 | SET | RESET | MONITOR MODE (MMO) |
| 3 | ENABLE | DISABLE | 0 BIT INSERT FUNCTION (BI) |
| 2 | - | RESET | RECEIVE MODE RESET (RST) |
| 1 | PRIMARY | SECOND. | PRIMARY/SECONDARY (PRI/SEC) |
| 0 | - | SELECTS WR0 | |

FIG. 4C

WRITE REGISTER 1 (WR1)

| DB | IF = 1 | IF = 0 | | | | |
|---|---|---|---|---|---|---|
| 7 | DECODED | SELECTS | 0 | 0 | 1 | 1 |
| 6 | DATA | RATE | 0 | 1 | 0 | 1 |
| 5 | | | 38.4 KBAUD | 19.2 KBAUD | 9.6 KBAUD | 4.8 KBAUD |
| 4 | | | | | | |
| 3 | | | | | | |
| 2 | DECODED | SELECTS | 0 | 0 | 1 | |
| 1 | READ | REGISTER | 0 | 1 | 0 | |
| 0 | SELECTS WR1 | - | RR0 | RR1 | RR2 | |

| REGISTER | ADAPTER REGISTER SELECT INPUT | ADAPTER READ INPUT | ADAPTER WRITE INPUT | ADAPTER DB0 INPUT | REGISTER WR1 DB1 | REGISTER WR1 DB2 |
|---|---|---|---|---|---|---|
| WR0 | 0 | 1 | 0 | 0 | X | X |
| WR1 | 0 | 1 | 0 | 1 | X | X |
| RR0 | 0 | 0 | 1 | X | 0 | 0 |
| RR1 | 0 | 0 | 1 | X | 1 | 0 |
| RR2 | 0 | 0 | 1 | X | 0 | 1 |
| SERIALIZER | 1 | 1 | 0 | X | X | X |
| DESERIALIZER | 1 | 0 | 1 | X | X | X |

COMMUNICATION ADAPTER FOR STORE LOOP COMMUNICATION SYSTEM

This is a continuation of co-pending application Ser. No. 06/669157 filed on Nov. 7, 1984 now abandoned.

BACKGROUND OF THE INVENTION

1. Field of the Invention

The present invention relates to communications systems in general and more particularly to devices for attaching devices, such as computers, terminals, I/O devices, etc. to said communications system.

2. Prior Art

The prior art utilizes several different types of communication highways for interconnecting nodes or stations. Each node is adapted to carry one or more data terminal equipment. The data terminal equipment communicates with other data terminal equipment via the medium which forms the communications highway.

The serial loop data communications system is a well known prior art communications highway. The basic serial loop data communications system consists of a length of communication media formed into a loop. The medium may be electrically conductive wires, coax cable fiber optics, conductors, etc. The two extremities of the communication media are connected to a central station which provides supervisory functions for the loop. Other stations which may include computers, terminal devices, etc. are serially connected to the loop. The system configuration is such that a sequence of electrical signals called a message originating at any station on the loop is available on a sequential basis to each active station on the loop. For example, a message originating at the supervisory station is available to the first active station on the loop. The message is next available to the second active station on the loop and so on until it is returned to the supervisory station.

The prior art has also disclosed several different techniques for controlling the loop communications system. U.S. Pat. Nos. 3,752,932 and 4,293,948 describe examples of such prior art control techniques. The patents seem to cover the techniques and procedures under which a station is allowed to dispatch and/or receive messages from the loop.

A necessary element in a loop communications system is the interface circuit arrangement which interconnects a data terminal equipment to the communication medium. The prior art abounds with different types of interface circuit arrangements. One of such circuit arrangements is disclosed in U.S. Pat. No. 4,424,565. In the patent the interface circuit connects a processor to a communication channel. The circuit is programmable and serves to dynamically translate the header portion of a data message on the channel, as it is received and thereby determine whether this data message is to be stored in the processor memory. If the message is to be stored, the interface circuit immediately converts the header field into a hardware address which is used to activate a specific location in the processor memory.

Still other types of communications adapters are disclosed in IBM Technical Disclosure Bulletin, Vol. 22, No. 8A, January 1980 (page 3059) and Vol. 13, No. 5, October 1970 (page 1151). These adapters are geared primarily to produce functions based upon the idiosyncrasies of the DTE and/or the protocol (set of rules used to control data movement on the loop) of the communications system.

SUMMARY OF THE INVENTION

It is therefore the object of the present invention to provide a more efficient multifunction communications adapter than was heretofore possible It is another object of the present invention to provide a multi-function low cost adapter particularly suited to interconnect terminals to a communications highway in which the SDLC protocol is used to facilitate the exchange of messages on said highway.

These and other objects of the present invention are achieved by providing a single chip in which the multiplicity of functions, needed to interface a DTE (such as a point of sale terminal) with a loop communications system, are integrated.

The single chip interface circuit arrangement includes a microprocessor interface circuit means which interfaces the hardware portion of the adapter with a microprocessor. The input to the interface circuit means includes the microprocessor data bus and a plurality of control lines which are set and/or reset by the microprocessor. An interrupt line couples the adapter chip to the microprocessor. An internal data bus system and control line couples a plurality of control registers with the microprocessor interface means. The registers are used to store receive/transmit data, command data and status information. The contents, i.e., bit setting and/or resetting, in some of the registers, are provided by hardware circuitry. The contents reflect certain conditions detected on the loop or conditions inherent in the adapter. Similarly, bits in some of the registers are set as a result of signals presented at the microprocessor interface by the microprocessor. An internal modem interface (IMI) arrangement is coupled to the registers and depending on the setting of the registers and/or the status of the adapter the IMI enables and/or disables the transmitting and/or receiving function of the adapter.

In one feature of the invention a monitoring circuit is provided on the adapter chip and is controlled to observe data on the loop without affecting the electrical characteristics of the data This feature further enhances the reliability of the adapter since the microprocessor can make sure that the adapter clock can be synchronized with data extracted from the loop prior to putting the adapter on line.

The foregoing features and other advantages of this invention will be more fully described in the accompanying drawings.

BRIEF DESCRIPTION OF THE DRAWINGS

FIGS. 3, 3A, 3B show a block diagram of the circuit components used in the adapter.

FIGS. 4, 4A-4D show a graphical representation of the control registers and the function which is generated from each bit in the registers.

FIG. 6 is a chart showing the signals necessary to select a particular register.

DETAILED DESCRIPTION OF PREFERRED EMBODIMENT

Although the present invention may be used to attach any terminal or station to a loop communications system, it works well when it attaches a point of sale terminal to a loop communications system. As such, the invention will be described in that environment. However, this should not be construed as a limitation on the scope of the present invention since it is the intention that the invention should be interpreted to cover the system disclosed hereinafter and all reasonable extensions thereof FIG. 1a shows a graphical representation of a loop communications system embodying the teaching of the present invention. The loop communications system includes a communication medium identified by numeral 10. The direction of signal traffic on the loop is unidirectional and is shown by the arrows. A store controller 12 is connected to the loop. The function of the store controller is to supervise the operation of the loop. To this end, the store controller generates poll signals and other necessary control information which enables one or all of the terminals identified by numerals 14 through 19 to transmit information on the loop. It should be noted that although three terminals are shown this should not be construed as a limitation to the scope of the present invention. As a practical matter, the number of terminals on the loop is determined by the size of the business establishment and the capability of the store controller for processing information from a large number of terminals and returning responses on a real time basis.

Figure 1:
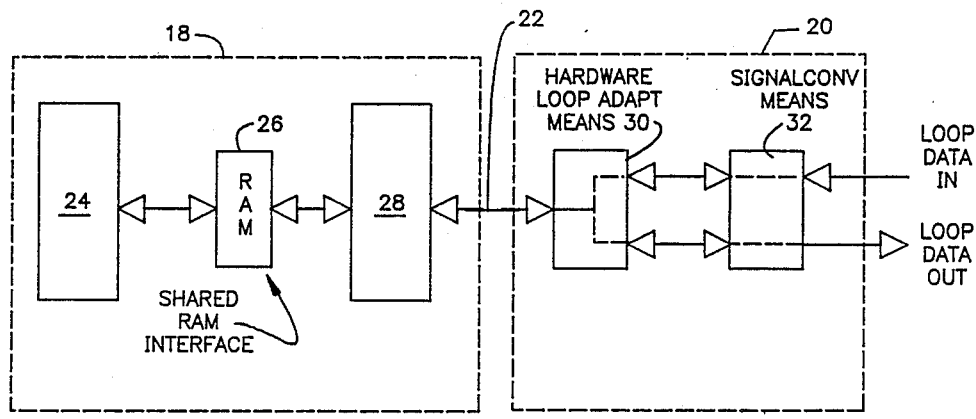
FIG. 1 shows a schematic of an adapter.
Figure 1A:
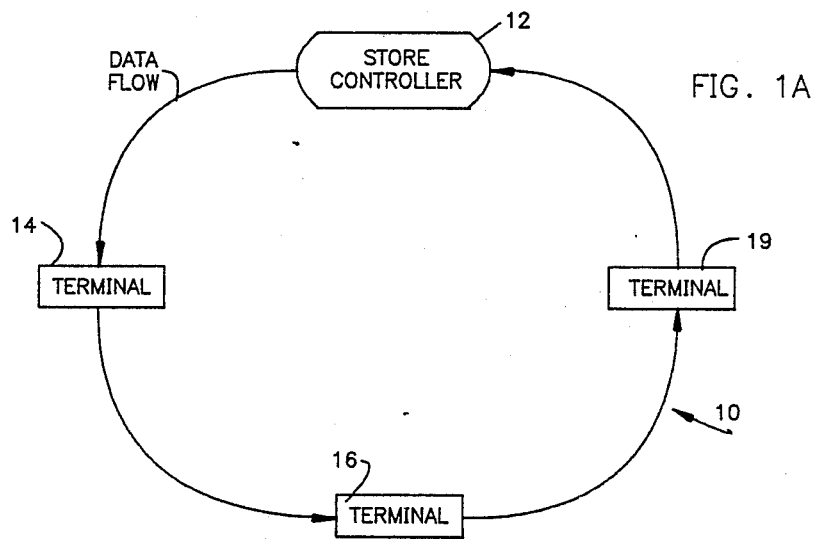
FIG. 1A shows a schematic for a loop communications system. The adapter of the present invention may be used to attach terminals to the loop.

FIG. 1 shows the apparatus which attaches a terminal and/or the store controller to the communications medium. The apparatus comprises of a controller 18 and an interface circuit means 20. The controller 18 is connected over conductors identified by numeral 22 to the interface circuit means 20. The components of FIG. 1 are used in the terminals while interface circuit means 20 is used in the store controller. The controller 18 comprises of a main system microprocessor 24 which is coupled by a shared RAM interface means 26 to a communication processor identified by numeral 28. The details of controller 18 are given in patent application Ser. No. 637369 filed Aug. 3, 1984, and assigned to the assignee of the present invention. This being the case, details of the controller 18 will not be given here. Suffice it to say that in the preferred embodiment of this invention, microprocessor 24 is the 80286 microprocessor manufactured by the Intel Corporation and the microprocessor 28 is the 8051 microprocessor manufactured by Intel Corporation. Also, the shared RAM interface 26 allows for the passing of commands, status, and messages to be transmitted between the processors and the interface circuit means 20.

Still referring to FIG. 1, interface circuit means 20 includes hardware loop adapter (ADPT) means 30 coupled over electrical conductors to analog signal conversion (CONV) circuit means 32. The arrow depicts the direction in which electrical signals representative of data flow in the system. To this end the signal from the upstream segment of the loop enters into analog signal conversion circuit means 32, flows into hardware loop adapter means 30 from whence the signal can be transmitted over conductor 22 into controller 18 or the signal can be wrapped through hardware loop adapter means 30 and fed back onto the downstream segment of the loop. As will be explained subsequently, this wrap-out capability, (i.e., taking data off the loop, wrapping it through the hardware adapter and sending it back on the loop) enables the adapter to check the accuracy of its transmit and/or receive clock before disturbing data flow on the loop.

Figure 2:
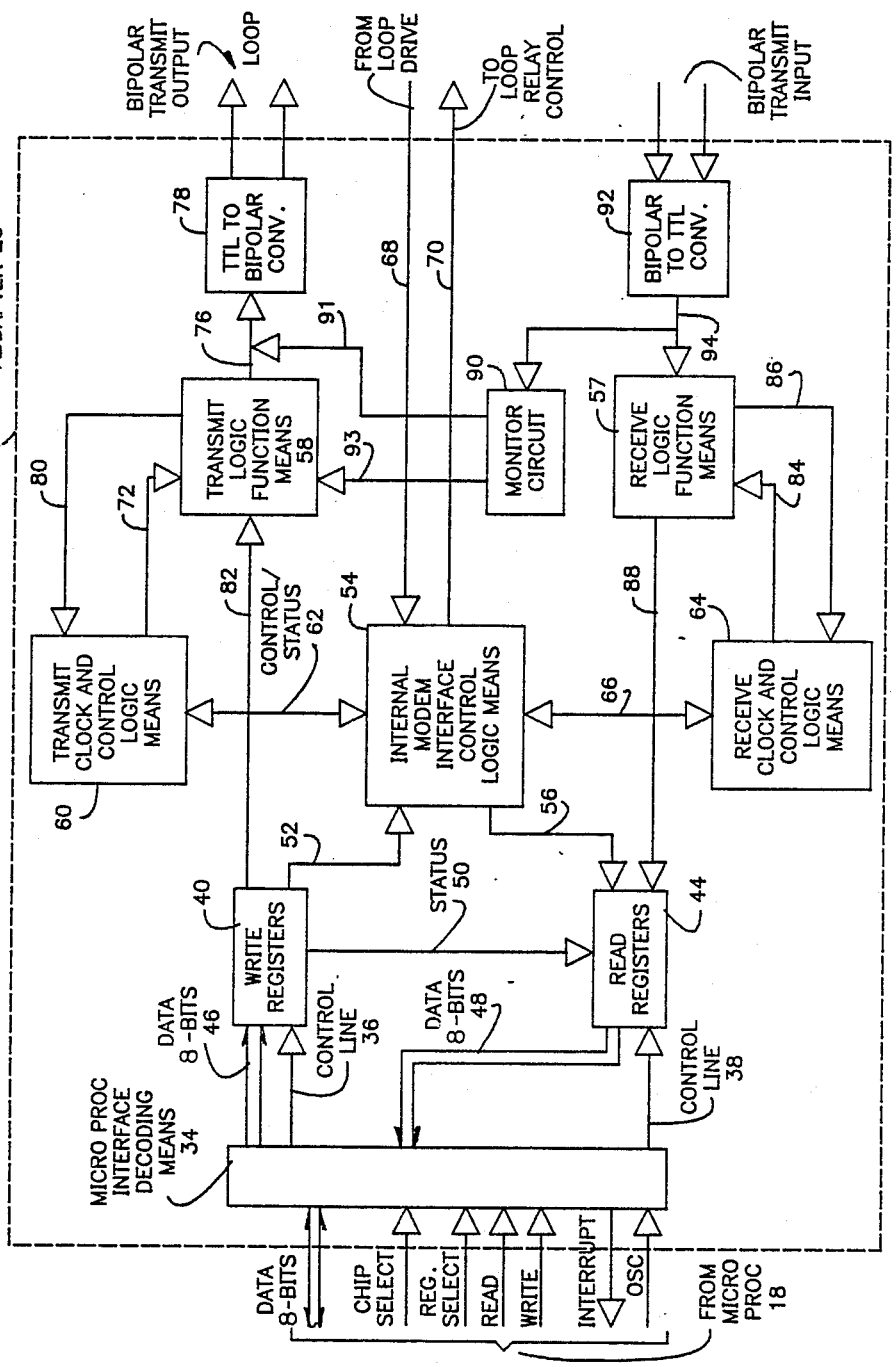
FIG. 2 shows a functional block diagram of the adapter.

FIG. 2 shows a functional block diagram for the communication adapter 20. The components which are internal to the broken line show internal components of the adapter while signals and/elements external to the broken line represent signals which exit and/or enter into the adapter. The adapter includes a microprocessor (micro proc) interface means identified by numeral 34. The microprocessor interface means 34 decodes the adapter registers (to be described subsequently) that the microprocessor wishes to read or write during a microprocessor bus cycle. As will be explained subsequently, the input line labeled chip select has to be active for the adapter to perform the decoding function. The microprocessor interface means 34 further includes an 8-bit bidirectional data bus and four control lines. The control lines are negative active chip select (for selecting the adapter), negative active read and write (for bus cycle definitions) and a register (reg) select line which determines whether the command/status registers (to be described subsequently) or the serializer/deserializer registers are being addressed. An interrupt line exits from the interface. The interrupt line becomes active when the adapter wishes to invoke the attention of the microprocessor. An oscillator line enters the microprocessor interface means 34. The function of the oscillator line is to provide basic clock signals to the adapter hardware.

Two sets of control lines adapted to carry control information and identified by numerals 36 and 38 exit the microprocessor means 34 and enters a bank of write registers identified by numeral 40 and a bank of read registers identified by numeral 44. An 8-bit data bus identified by numeral 46 couples the output of microprocessor interface means 40 to write register 40. Similarly, a data bus (8-bit) identified by numeral 48 interconnects the read registers 44 to the microprocessor interface means 34. Status information between write registers and read registers is exchanged on conductor 50. Details of the write and read registers will be given subsequently. Suffice it to say at this point that the read register primarily contains status and data which must be passed up to the microprocessor while the write register contains data to be transmitted on the loop and commands defining functions which the adapter must perform.

Conductor 52 interconnects write register 40 to internal modem interface (IMI) control logic means 54. The signals which are transmitted on conductor 52 from the write registers 40 are primarily control information. Likewise, conductor 56 interconnects the output of internal modem interface control logic means 54 to a bank of read registers 44. The information carried on conductor 56 is primarily status information. As will be explained hereinafter, the function of the internal modem interface control logic means 54 is to generate a modified set of the well-known and conventional RS-232 control signals which are used to enable/disable the receive logic function means 57 and the transmit logic function means 58. To this end, the internal modem interfaces control logic means 54, receives input from write register on conductor 52, inputs from transmit clock and logic means 60 on conductor 62, inputs from received clock and control logic means 64 on conductor 66 and signals on conductor 68 from loop driver circuitry (to be described subsequently). The internal modem interface control logic means 54 also generates control signals which are outputted on conductor 70. The signal on conductor 70 is used for controlling the relay (not shown) which physically connects the station to the loop.

Still referring to FIG. 2, transmit clock and control logic means 60 generates the clocks which are fed over conductor 72 into transmit logic function means 58. The transmit clock and control logic means 60 use an external oscillator (not shown) with a frequency of 14.7456 MHz as a base clock. This output clock is divided down by hardware circuitry to generate a clock used by the transmit logic function means 58. As will be explained subsequently, the adapter is capable of operating in two modes. The so-called primary mode where the station which is connected to the loop is performing the supervisory function on the loop and the secondary mode where the station which is connected to the adapter is not performing supervisory functions.

Stated another way, in the secondary mode the terminal has access to the loop but cannot perform any supervisory functions such as poll, etc. When the adapter is operating in the primary mode, the transmit clock is generated directly from the input oscillator. If the adapter is in the secondary mode, the transmit clock is generated from the input oscillator and the receive data via a phased locked loop. The phase locked loop insures that the adapter will not generate any delays between the data which is being received and those being retransmitted. The transmit logic function means 58 transmits a serial stream of data from the adapter on conductor 76 into logic conversion means 78. The logic conversion means 78 changes the TTL signal to a bipolar signal which is outputted onto the loop. The data which is transmitted from the transmit logic function means 58 uses the clock generated in the transmit clock and control logic means 60. If the adapter is reclocking data, data is received by the adapter and is passed through this function to be retransmitted on the loop. When the microprocessor places data in the serialized register (to be described later) for transmission on the loop, this function will transmit the data one bit at a time at the selected data rate.

This transmission is only done after an end of poll (EOP) character has been detected by the logic function means (to be described subsequently). The transmit logic function means also performs the SLDC bit insertion function. This function is a well known function, details of which are given in U.S. Pat. No. 3,752,932. Suffice it to say at this point that this function places a "0" bit after every string of five continuous one bits in the data portion of a message.

A clock correction feedback signal is generated by the transmit logic function means 58 and is fed back on conductor 80 to the transmit clock and control logic means 60. The feedback signal is used for synchronizing the clock with the data. Serial data to be transmitted on the loop is outputted from one of the registers in the bank of write register 40 on conductor 82 into the transmit logic function means 58.

The receive clock and control logic means 64 generates the clock used by the receive logic function means 57 to clock data bits into the receive latch (to be described later) and from there to the deserializer register (to be described later). This clock is generated from the base 14.7456 MHz oscillator and the received data via a phase locked loop. The phase locked loop ensures that the sample clock generated by the receive clock and control logic means will also be in the correct relationship with the incoming data stream so that the proper data is clocked into the deserializer register (to be described subsequently). The clock signal from the receive clock and control logic means 64 is fed over conductor 84 into the receive logic function means 57. Similarly, feedback error clock correction signal is fed over conductor 86 into the receive clock control logic means 64. Serial data is fed over conductor 88 into the read register 44. The receive logic function means 57 uses the clock generated by the receive clock and control logic means 64 to clock the receive data stream into the adapter. The data is then passed from an initial receive latch (to be described later) to the deserializer register. The data can then be read by the microprocessor.

The receive logic function means 57 also decodes three data bit patterns which have significance in the present loop communications system. The present loop communication system uses a loop communication protocol which is a subset of the well-known SDLC protocol. This protocol was invented by the assignee of the present invention. These patterns are given below in Table I with the least significant bit shown first.

TABLE 1

| | | |
|---|---|---|
| 1. 0111 1111 = FE | = | the SDLC "EOP" character |
| 2. 0111 1110 = 7E | = | the SDLC flag character |
| 3. 0000 0000 = 00 | = | the SDLC shut-off character |

In the SDLC protocol these characters are not transmitted with the zero bit insertion. If any of these characters are received by the adapter, an interrupt will be generated to the microprocessor and the bits set in one of the registers (to be described subsequently). The receive logic function means will delete the zero bit that is received after the reception of the five consecutive one bits. This action removes the zero bit that was inserted by the original transmitting adapter The monitor circuit means 90 is connected over conductor 91 to TTL bipolar conversion means 78 and over conductor 93 to transmit logic function means 58. The monitor circuit means 90 allows the adapter to view the incoming data stream from the store loop without affecting the data thereon. When the circuit is activated by setting of bit 4 of the WRO register (to be described later), the receive data is brought into the adapter, passed through a combinatorial logic circuit (to be described subsequently) and placed back onto the store loop. This circuit allows the microprocessor program to ascertain if the clock that is being generated by the adapter can be locked into the data stream being produced by other terminals on the loop before the adapter's data retransmission circuitry is activated.

The bipolar to TTL conversion logic means 92 is coupled by conductor 94 to the receive logic means 57 and monitor circuit means 90, respectively. The function of the bipolar to TTL conversion logic means 92 is to receive bipolar signals from the loop converts the signal to a TTL logic level. The bipolar TTL signal is generated by an external analog circuit (to be described later).

Figure 3A:
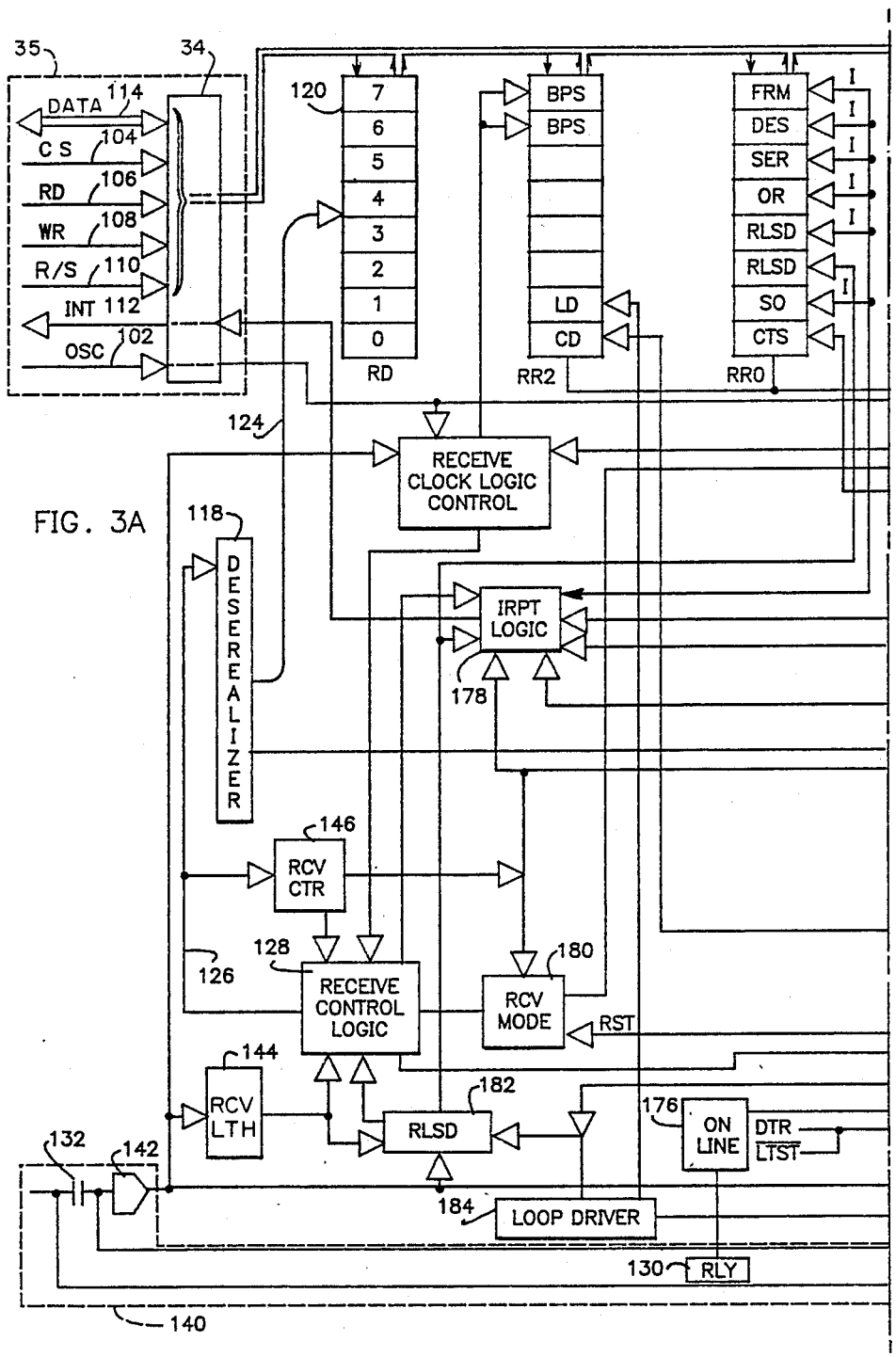

FIGS. 3, 3A and 3B show a block diagram of the electrical circuitry used in the adapter. The circuitry includes a microprocessor interface means 35 which couples the adapter to the microprocessor. The microprocessor interface means 35 comprises of microprocessor interface decoding means 34 and bidirectional data bus 114, chip select (CS) line 104, read (RD) line 106, write (WR) line 108, register select (R/S) line 110, interrupt (INT) line 112 and oscillator (OSC) line 102. The functions performed by the control lines and the decoding means 34 have already been described and will not be repeated. Suffice it to say that decoding means 34 decodes the adapter register (to be described subsequently) that the microprocessor wishes to read or write during a microprocessor bus cycle. The chip select (CS) input line must be active for the adapter to perform any of the decodes.

The microprocessor interface decoding means 34 is coupled by internal data and control lines cabling system to the control registers. There are three write-only registers identified as WR0, WR1 and WR and four read-only registers identified as RD, RR0, RR1 and RR2. Each register is eight bits wide. The specific register that is being read or written to is defined by the read and write inputs, the register select input, data bit 0, and the state of bits 1 and 2 of WR1.

A simplex interrupt (INT) line 112 emerges from the microprocessor interface and a bidirectional data bus identified by numeral 114 forms external or microprocessor data bus into the chip. As described above, the adapter contains a plurality of control registers (to be described hereinafter) which perform command/status functions of the adapter. These registers are selected based on the status of the controlled lines and data bus at the microprocessor interface 34. By decoding the active lines the adapter interface is made to select the proper register which the microprocessor needs for reading or writing.

Referring to FIG. 6 for the moment, a chart showing how these registers are selected is given. The chart also contains information as to how the serializer 116 (FIG. 3) is selected to read out data for transmission onto the loop. The chart also shows how the deserializer 118 (FIG. 3) is selected to read data from the loop into read register 120. The first column of the chart identifies the registers, the second column represents the state of the register select input line 104, the third column represents the state of the read input line 106, the fourth column represents the state of the write input line 108, the fifth column represents the state of bit "0" of the data bus into the adapter, the sixth column represents the state of bit "1" of write register 1, and the seventh column represents the state of bit "2" of the write register 1. For example, in order to select write register 0 (WR0) the select input signal has to be in the "off" state (this assumes that a logical "0" represents an "off" condition and a logical "1" represents an on condition). The "read input" has to be "on." The "write input" has to be "off." The "DBO input" is "off," and bits 1 and 2 of write register 1 are in a don't care state. In a similar manner, the other registers, including the serializer and deserializer, can be selected by setting the appropriate lines and bit in accordance with the information shown in the chart.

Referring again to FIG. 3, read register (RD) 120 is connected over bus 124 to deserializer 118. The deserializer is connected over conductor 126 to receive control logic means 128. The function of deserializer 118 is to accept data from the loop, deserialize the data and store it into RD register 120. From the RD register the data is transmitted over the bus to the microprocessor.

The adapter is connected to the loop by loop interface means 140. The loop interface means comprises of relays (RLY) 130, 132, 134, 136 and 138.

As will be explained subsequently, depending on the setting of relay 130 and associated contact 132, 134, 136 and 138 data on the loop communications system can be diverted through analog circuit means 142 into receive latch 144 through receive control logic means 128 and into the deserializer which deserializes the data into a multiplex stream and stores it into read register 120. The receive counter 146 counts the data on a bit basis as it is fed into the deserializer. The data is then fed over the multiplexer bus 22 (FIG. 1) into the microprocessor. The status of the interface signals for selecting the deserializer is described above and shown in FIG. 6.

The data to be transmitted onto the communications system is written over the microprocessor bus into write register (WR) 122. The status of the interface control lines for selecting the serializer 116 is also shown in FIG. 6. The output from write register 122 is coupled over multiplexor bus 148 into the serializer 116. The function of the serializer 116 is to serialize the data which is delivered on the multiplexer bus into a bit stream and delivers the bit stream to transmit control logic 150. The output from transmit control logic 150 is fed into logical "and" circuit 152. The output from "AND" circuit 152 is fed into "OR" circuit block 154 and from the "OR" circuit into transmit (XMIT) latch 156. The signal is then transmitted into AND circuit 158 through OR circuit 160 from whence it is processed by analog circuit means 162 and then onto the communications system. As characters are fed from the serializer into transmit control logic 150 a transmit counter 164 keeps track of the bits. Also, control signals are fed into transmit control logic 150 from transmit clock logic control 165.

Still referring to FIG. 3, the control registers further include two write registers identified as write register (WR) 0, write register (WR) 1, and three read registers identified as read registers (RR) 0, read register (RR) 1 and read register (RR) 2.

The write registers can be written into by the control microprocessor over the data bus. Similarly, the read registers are written into by the adapter's hardware circuitry.

Referring to FIGS. 4-4d for the moment, a schematic representation of the registers and definitions for each bit are given. The bit definitions are also shown in abbreviated form in the registers of FIG. 3. The first column in each of these schematics represents the data bit (DB), the second and third columns give the state of the bit, for example, the bit could be in a logical "1"-state which is interpreted as being "on" or the bit may be in a logical "0" state which is interpreted in the present invention as being off. The fourth column gives the definition for the bit when that bit is set in a particular state. Abbreviations for the definitions are shown bracketed in the respective charts and non-bracketed in FIG. 3.

Write register 0 is used to control the various communication functions of the adapter. With respect to the graphical representation in FIG. 4c, the bit definition for write register 0 is as follows:
Bit 7 corresponds to the RS-232. signal "Data Terminal Ready". As stated before, RS-232 is a standard electrical and mechanical interface which is well known and defined by the EIA. When set active by the processor, the adapter will activate the relay and insert the terminal into the communications loop if bit 5 is not also set. It also allows the adapter to generate and transmit interrupt into the microprocessor.

Bit 6 corresponds to the RS-232 signal "Request to Send". When set active by the microprocessor, the bit activates the logic which will generate transmit interrupt into the microprocessor when the proper conditions are met.

Bit 5 corresponds to the RS-232 signal "Local Test". When set active by the processor, puts the adapter in a test mode of operation where the transmit data is wrapped to the receive data. The adapter is isolated from the loop when this bit is set;

Bit 4 When this bit is set, the adapter is placed in the "monitor mode" of operation. In this mode, the adapter does not reclock the store loop communications data as it passes through the adapter.

Bit 3 This bit enables/disables "bit insert," SDLC function which is necessary for the operation of the store loop communications network. As stated above, the insert feature is a special characteristic of SDLC protocol which requires that the data stream may not have more than five consecutive logical "1's". If five consecutive one bits are sent in the data stream to the adapter, the adapter will insert a zero bit. On receiving data from the loop, the adapter performs the same function. This function is known in SDLC as bit stuffing, and destuffing.

Bit 2 If set by the microprocessor, this bit will disable the adapter receive interrupts until the next flag character is recognized by the adapter.

Bit 1 This bit sets the adapter into the primary or secondary terminal mode of operation on the loop. As described above, the adapter is in a primary mode when the terminal which is attached to it is the controlling terminal that controls the entire loop. Among the control functions is the generation and transmittal of polls which gives each station the opportunity to place its data which is directed to the control station. Otherwise, all stations which are not running as a control station are running in the secondary mode.

Bit 0 This bit is part of the decode for WR 0. It must be set to a 0 when writing to WR 0.

When the adapter is running in the primary mode, a phase lock loop (PLL) is used to generate the clock that clocks in the receive data. The transmit data clock is generated from a count down of the input oscillator 102, FIG. 3. Likewise, if the adapter is running in the secondary mode, a PLL is used to generate the clocks for both the receive and transmit data.

With reference to FIG. 3, the bit definition for each of these functions in WR 0 is identified by the abbreviation in the respective bit position. To this end, in the bit 7 position (DTR) represents Data Terminal Ready. Similarly, RTS (in the sixth bit position) represents Request to Send, and so forth. The output from each of the bit positions of the WR 0 is transmitted over conductor 166 to general reset circuitry 168, CTS control logic 170, shut off (SO) latch 172, clock data latch 174, on line latch 176 and interrupt (IRPT) logic means 178.

It should be noted that except for bits RM and OL all the bits in read register (RR) 1 are similar to the bits in WR0 and are set simultaneously with the bits in WR 0. By setting bits in RR1 and WR 0 simultaneously, whenever the microprocessor is interrupted by the adapter hardware because of a set of conditions (to be described subsequently) the microprocessor can interrogate read register 1 to determine where to begin operating when the interrupt is serviced.

Still referring to FIGS. 3 and 4D, WR 1 is used to set the data rate at which the adapter is operating and to select the read register that will be read during the next microprocessor read operation to the adapter. The bit definition for the used bit in this register is given in FIG. 4D. It should be noted that the decode on bits 1 and 2 identified in FIG. 3 as pointers (PTR) are used to select one of the read registers. To convey this selection function, these bits are bracketed with a line exiting from and pointing to RR1, RR0, RR2.

Still referring to FIG. 3, in addition to the deserializer and read register 120 the microprocessor may read read register 1, read register 0 and read register 2. Read Register 0 (RR 0) is the interrupt register. It is used to indicate to the microprocessor the source of an interrupt generated by the adapter's hardware. Each bit definition is given in FIGS. 3 and 4. Bits 7 and 6—These bits are encoded by the adapter to indicate to the microprocessor that one of three types of characters have been received by the adapter. The following is the information that these two bits give the microprocessor for each of the four possible bit combinations.

1. Bit 7=0, Bit 6=0: The interrupt was not a receive interrupt.
2. Bit 7=0, Bit 6=1: The adapter has recived a data byte.
3. Bit 7=1, Bit 6=0: The adapter has received an EOP character.
4. Bit 7=1, Bit 6=1: The adapter has received a flag character.

Bit 5 This bit indicates that the source of the interrupt is that the transmit serializer is empty and the microprocessor may write the next transmit data byte to the serializer register.

Bit 4 This bit indicates that the source of the interrupt is that an overrun condition on the deserializer or an underrun condition on the serializer has occurred.

Bit 3 This bit indicates that the source of the interrupt is that a loss of carrier on the store loop has been detected by the adapter.

Bit 2 This bit is the status of the input to the adapter which indicates the condition of a carrier on the store loop. This bit is not an interrupt source.

Bit 1 This bit indicates that the source of the interrupt is that a transmit shut-off character has been received by the adapter.

Bit 0 This bit is the status of the internally generated adapter signal which corresponds to the RS-232 signal "Clear to Send." This bit is not an interrupt source.

Except for Bits 0 and 3, the bits in RR1 correspond directly and indicate the state of the bits defined in WR0.

The two most significant bits in RR2 correspond directly and indicate the state of the two most significant bits 7 and 6 in WR 1 which are set to select the adapter data rate. Bits 1 and 0 are the only other bits used in RR2. The definition of the function of these bits are as follows:

Bit 1—If this bit is a 1, it indicates that the transmitted data from the adapter is being converted from a single TTL signal to a bipolar TTL signal correctly.

Bit 0—This bit indicates the status of the received data reclock function. If the adapter is reclocking the received data before transmitting it onto the store loop, this bit will be a 1. Also, bit 1 known as the loop driver (LD) bit is set from loop driver means 184. The function of the loop driver is to monitor the analog circuit means 162 and to set the latch when the circuit is operating in a satisfactory condition. Likewise, bit 0 (RR2) is set from the clock data latch 174. It should be noted that the appropriate signals which are used to provide the function emanating from each block are labeled on lines going into the blocks.

Still referring to FIG. 3, the interrupt line 112 emanating from the adapter is brought active for any of the following reasons:

1. An SDLC flag character (hexadecimal 7E) was received.
2. An SDLC EOP or "go ahead" (hexadecimal FE) was received.
3. A data byte has been received.
4. The transmit data serializes empty.
5. There has been either a serializer or deserializer overrun.
6. The adapter detects the absence of any data on the loop. (If no message is being transmitted, the primary station should be idling the loop by transmitting flag characters.) The absence of data will cause an RLSD interrupt.
7. An interrupt will be generated if the adapter is in secondary mode, transmitting and receiving a "Shut-Off" command. As stated before, the causes of the generated interrupt are found by reading register RR0.

Figure 5:
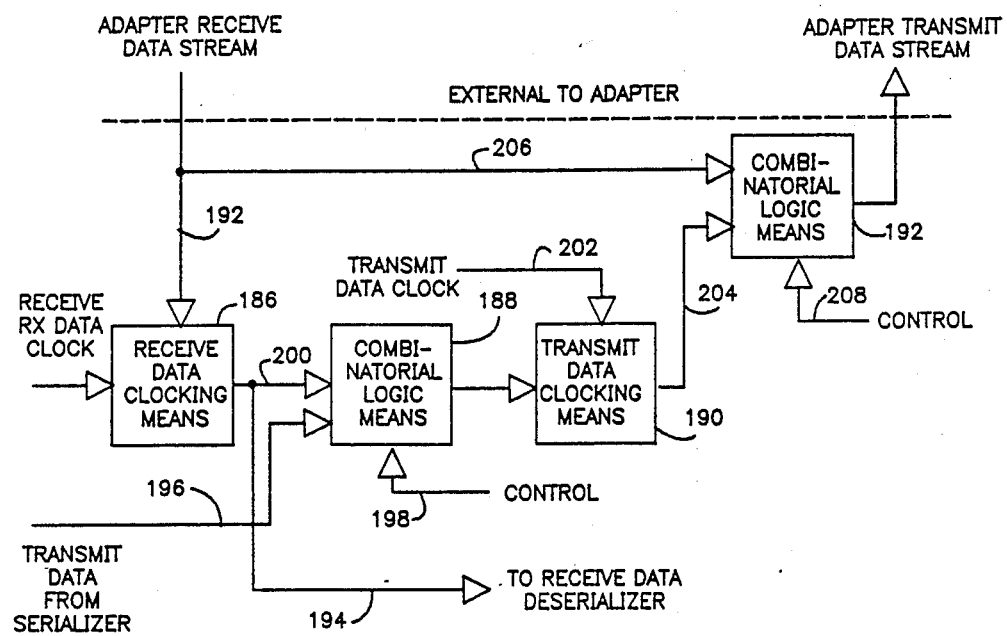
FIG. 5 shows a block diagram of the monitoring circuitry.

FIG. 5 shows a block diagram of a circuitry which enables the adapter of the present invention to either monitor the loop data stream or bring the data into the receive circuitry and reclock out of the adapter through the transmit circuitry. To implement this function, the adapter has to be placed in the monitor mode by setting bit 4 in Write Register (WR)0. In monitor mode the received data stream is passed through combinatorial logic, by passing the transmit circuit, and passed out of the adapter. The feature allows the control microprocessor to receive data from the loop without altering it.

Still referring to FIG. 5, the facility for performing the monitor function includes a receive data clocking means 186. The receive data clocking means receives a stream of incoming data from the loop on conductor 192. The data on conductor 192 is clocked into receive data clocking means 186 by the receive data clock. The output from the RX data clock means 186 is fed over conductor 194 to the deserializer 118, FIG. 3. The data can then be shipped up from the deserializer into the microprocessor where the microprocessor can make sure that the adapter's clocking facility is working satisfactorily before data is disrupted on the loop.

Still referring to FIG. 5, the output signal from the received clocking means 186 is fed into combinatorial logic means 188. Transmitted data from the adapter's serializer is fed over conductor 196 into the combinatorial logic means 188. Also, control signals are supplied on conductor 198 into the combinatorial logic means 188. As will be explained subsequently, the function of the control signals on conductor 198 is to select one of the data streams on conductor 196 or 200 for transmission into transmit data clocking means 190. Transmit data clock 202 clocks the data out of the transmit clocking means 190. The output from transmit data clocking means 190 is fed over conductor 204 into combinatorial logic means 192. Another source of data into combinatorial logic means 192 is the loop data which is supplied on conductor 206. The control signals on conductor 208 select which one of the data sources should be transmitted to the combinatorial logic means 192 onto the loop.

As stated previously, this circuit allows the adapter to monitor the data on the loop, reclock the data on the loop through the adapter circuits or transmit data originating at the terminal which the adapter couples to the loop. When the appropriate bit is set in WR0, the received data stream is supplied on conductor 206 into the combinatorial logic means 192 from whence it is retransmitted back on the loop without being disturbed by the adapter.

Figure 7:
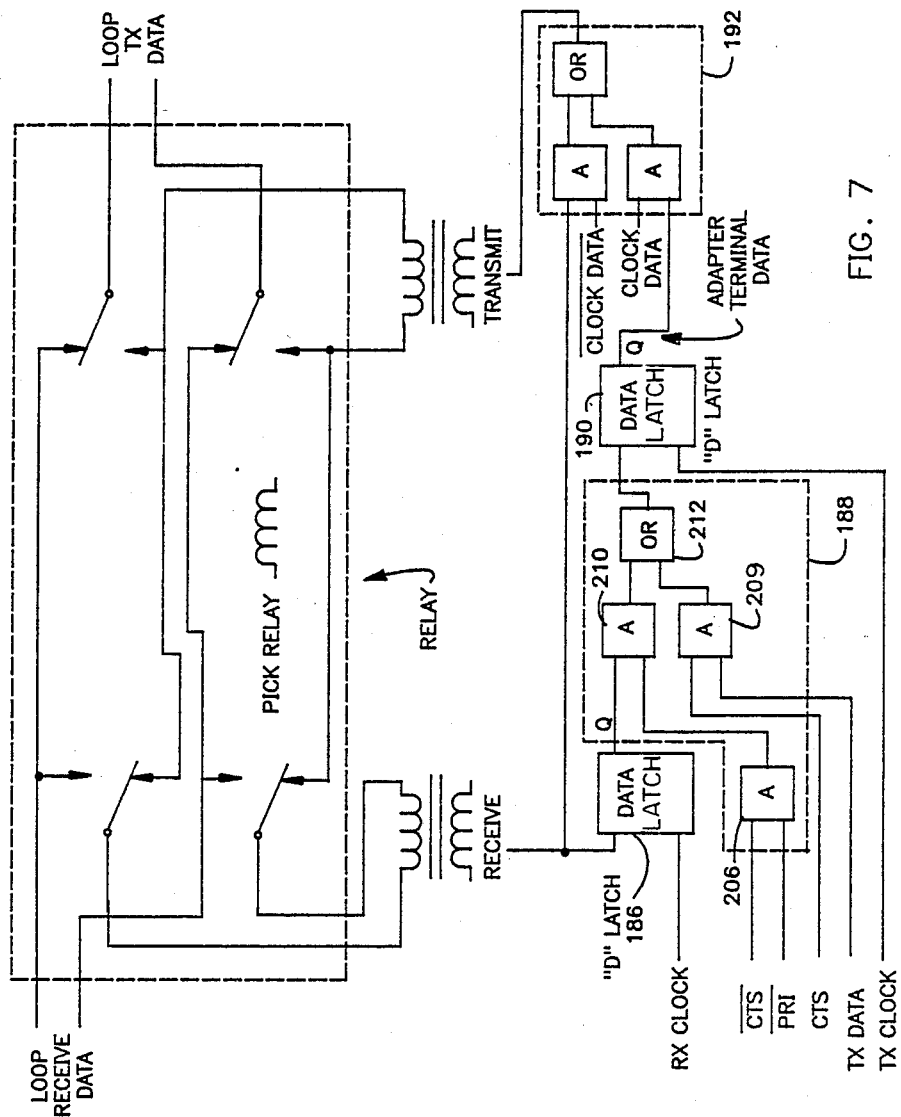
FIG. 7 is a schematic showing the relays which couple the adapter to the loop and the combinatorial logic circuits which control data flow into the adapter.

FIG. 7 shows the interface that couples the adapter to the serial loop communications system. The figure also shows the details of the logic and combinatorial circuitry which performs the monitor mode function shown as block diagram in FIG. 5. In order to simplify the description common numerals are used to identify the combinatorial logic circuits which are shown in block diagram form in FIG. 5. To this end, the receive data clocking means 186 (FIG. 5) is represented by "D" Latch 186 in FIG. 7. Similarly, the combinatorial logic means 188 (FIG. 5) is represented in FIG. 7 by AND circuits 206, 209, 210 and OR circuit 212. The other combinatorial logic in this figure is self-explanatory and a detailed description will not be given. It should be noted that the control signal on conductor 208, FIG. 5, is supplied by the signals Clock Data and $\overline{\text{Clock Data}}$ (FIG. 7). Also, the control signal which is supplied on conductor 198, FIG. 5, is represented in FIG. 7 by control signal CTS, $\overline{\text{PRI}}$, $\overline{\text{CTS}}$, TX data etc. The definition and function for each of these signals have already been given above and will not be repeated here.

Figure 8:
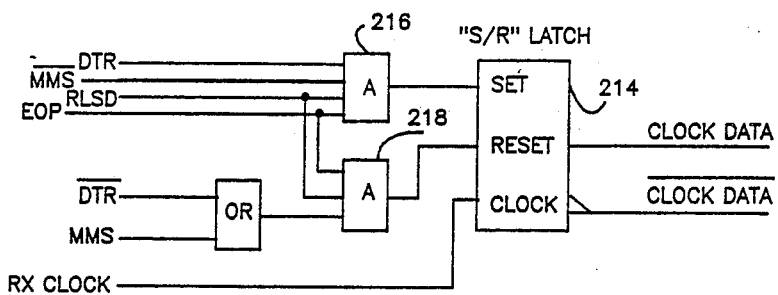
FIGS. 8 and 8(a) show logic circuitry which generates certain control signals.
Figure 8A:
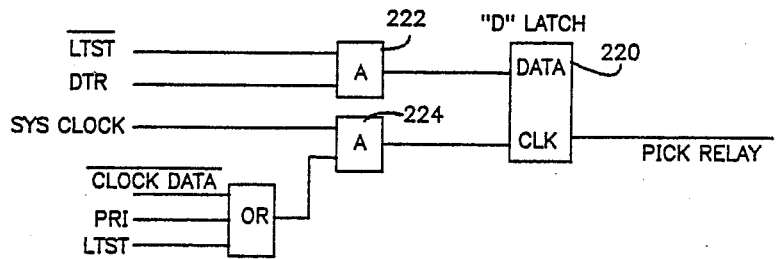

Referring to FIGS. 8 and 8a for the moment, the combinatorial logic circuit which is used to generate the Clock Data, $\overline{\text{Clock Data}}$ are shown in FIG. 8 while the combinatorial logic circuit which generates a pick Relay Signal is shown in FIG. 8a. The Clock Data and $\overline{\text{Clock Data}}$ are generated from set/reset latch 214. The output from a four-way AND circuit 216 is coupled to the set terminal of the latch. Also, the output from a three-way AND circuit 218 is connected to the reset terminal of the latch. Likewise, the relay signal is generated from the output of the D latch 220. The input of the latch is supplied from two two-way AND circuits identified by numerals 222 and 224, respectively.

Referring again to FIG. 7, the flow of data through loop relay input into the adapter logic and back out again is shown. The relay in FIG. 7 has its contact in the "unpicked" condition. In the "unpicked" condition, data flows directly through the relay and does not enter the analog logic. In the "picked" condition data flows into analog circuitry (not shown in FIG. 7 but shown in FIG. 3) which converts the bipolar signal to a logical level. This logical level signal is processed by the hardware adapter. FIGS. 8 and 8A show the circuits that generate the control signals "pick relay" and "Clock Data" in FIG. 7. Following is a list of signals used in the circuits and the definitions for the signals.

RX Clock This clock is synchronized to the receive data stream and used as the sample clock for received data. It is derived from the Sys Clock adapter input.

TX Clock This clock is used to place transmit data values onto the loop. It is derived from the Sys Clock adapter input.

CTS "Clear to Send" becomes active under two conditions. (1) If the terminal is a primary or controlling terminal on the loop, CTS will become active whenever the software activates the "Request to Send" (RTS) signal. (2) If the terminal is a secondary or "slave" terminal on the loop, CTS will become active whenever RTS has been activated and the last byte in the data stream, an EOP (End of Poll), has been recognized by the adapter hardware.

PRI "Primary" is set by the software controlling the adapter to indicate whether the adapter is the primary (the signal would be active) terminal on the loop, or if the terminal is a secondary terminal (the signal would be inactive).

TX Data This is the bit data stream that is to be placed on the loop by the adapter.

DTR "Data Terminal Ready" is a signal set by software indicating that the terminal should be placed into the loop by picking the relay. It is used in conjunction with LTST.

LTST "Local Test" is a software activated signal which indicates that the terminal is in self-test mode and should not be placed on the loop. When this signal is active, the adapter will transmit a data stream through the "unpicked" relay contacts and receive the data exactly as if the data was from an upstream terminal. All other control signals would be set during this wrap test as if the terminal was operating on the loop.

MMS "Monitor Mode Select" is set by software whenever the software wishes to monitor the loop data stream but not possibly disrupt it by reclocking through the TX data latch.

EOP "End of Poll" is a hardware activated signal which is set whenever the last character in a data stream is detected. This character is an EOP character.

RLSD "Received Line Signal Detect" is a hardware activated signal which indicates that the RX Clock has been synchronized to the RX data stream and that a valid data stream has been recognized by the hardware.

SYS Clock "System Clock" is the oscillator input to the adapter.

This completes the description of the adapter.

The above-described multi-function integrated circuit adapter may be used for attaching any data processing terminal to a loop communication system. In one application the present adapter is used to interface microprocessors in a point of sale terminal to a store communication loop. Preferably, the store loop architecture is a derivative of the IBM Synchronous Data Link Control (SDLC) communication architecture. This is a well-known architecture and details will not be given here. Suffice it to say that the architecture is very efficient in enabling machines to communicate with one another. The above-described single chip adapter contains the following logical functions:

1. An 8-bit parallel data bus processor interface which uses four control lines to read and write data and command/status to the adapter. All input and output signal levels are TTL compatible.
2. A modified RS-232 command/status interface to the microprocessor.
3. Serialization of transmitted and deserialization of received adapter data.
4. Two separate integrated digital phase locked loops used for transmit and receive clock.
5. Given a single input oscillator, one of four different data rates can be selected.
6. Transmit and receive data may be wrapped internally to the chip for diagnostic purposes.
7. The "0" bit insertion and deletion necessary for SDLC transmission reception is done by the adapter.
8. Facilities for generating an interrupt to the microprocessor are provided.
9. Recognition of SDLC "EOP" or "Go Ahead" flag and Shut-Off characters.
10. The adapter can be configured for either primary or secondary terminal operation.
11. The adapter controls the relay that connects the terminal to the store loop and as a result is transparent to the microprocessor.
12. The adapter provides facilities for allowing the terminal to monitor the loop data flow without reclocking the data as it goes in and out of the adapter.
13. The adapter provides facilities for the secondary terminal to remove itself from the loop without disrupting any data flow that may be on the loop when the command to disconnect is given.

We claim:

1. A single chip adapter for interfacing a data processing terminal with a loop communications system comprising:
   a plurality of control registers operable for storing data and/or control information;
   a control interface means operable for selecting a first one of the control registers;
   an internal data bus and control lines interconnecting the control registers and the interface means;
   a transmit circuit means operable for processing information for dispatching on said loop system;
   a receive circuit means operable for processing information received from said loop communications system and for setting selected bits in a second one of the control registers; and
   an internal modem interface control logic means operable for monitoring said first and second one of the registers and utilizing bit settings in said registers for generating electrical signals for enabling/disabling the transmit circuit means and/or the receive circuit means so that data is being received and/or is being transmitted on said loop.

2. The adapter of claim 1 further including an off chip microcomputer;
   an external data bus coupling the control interface means and the microcomputer;
   said data bus being operable for carrying data; and
   a plurality of control lines connecting the control interface means and the microcomputer and operable for conveying control information between said microcomputer and the control interface means.

3. The adapter of claim 2 further including:
   first means interconnecting the transmit circuit means to the loop and operable for converting from a first polarity to a second polarity the electrical signals outputted from the transmit circuit means;
   and second means coupled to the receive circuit means and operable for converting from the second polarity to the first polarity electrical signals extracted from the loop communications system.

4. The adapter of claim 2 further including means operable for monitoring a predetermined bit in said first one of the control registers and operable for generating an enabling signal when the bit is placed in a first state; and
   means coupled to the receive circuit means and responsive to the enabling signal for extracting a data stream from said loop communications system simultaneously sending the data stream to the off-chip microcomputer and returning said data stream to said loop communications system with the electrical characteristics of said data stream being unchanged.

5. The adapter of claim 1 further including means operable for monitoring at least one predetermined bit in said first one of the control registers and operable for enabling the terminal to operate in a first mode if the bit is set to a first state and operable to operate in a second mode if the bit is set to a second state.

6. The adapter of claim 5 wherein the first mode represents a primary mode wherein the adapter and attached station provide the supervisory functions on said loop.

7. The adapter of claim 5 wherein the second mode represents a secondary mode wherein the adapter with attached station provides non-supervisory functions.

8. The adapter of claim 1 wherein the plurality of control registers includes a set of write registers operable to receive data from the control interface means; and
a set of read registers operable to receive data from the internal modem interface means.

9. The adapter of claim 1 wherein the transmit circuit means includes a transmit clock and control logic means operable for generating a transmit clock; and
a transmit combinatorial logic circuitry operable to utilize the transmit clock to selectively transmit a stream of data supplied to the adapter from the data processing terminal.

10. The adapter of claim 9 wherein the transmit clock and control logic means includes a phase lock loop.

11. The adapter of claim 1 wherein the receive circuit means includes a receive clock and control logic means operable for generating a receive clock;
a receive latch; and
receive combinatorial logic circuitry operable to utilize the receive clock to Clock Data into the receive latch.

12. A single chip circuit arrangement operable for interfacing a data processing device with a loop communications system comprising:
a plurality of write registers;
a plurality of read registers;
a plurality of simplex lines operable for carrying control information;
a bidirectional data bus operable for transporting data into and away from said single chip circuit arrangement;
first interface decoding means coupled to the data bus and the simplex lines and operable for monitoring the simplex lines and the bidirectional data bus and to select as a control register one of the plurality of registers identified by signals on said lines;
second means coupled to the write registers and operable for receiving data from the write registers, processing said data for transmission on said loop communications system;
third means coupled to the read registers and operable for receiving data from said loop communications system; processing the data and placing it in a read register; and
fourth means operable for examining the control register and extracting information for providing electrical signals for enabling/disabling the second means and/or the third means so that data is being received and/or is being transmitted on said loop communications system.

13. The circuit arrangement of claim 12 further including means coupled to the third means and operable for selectively extracting data from said loop examining the data and replacing the data on the loop without affecting the electrical characteristics of said data.

14. The circuit arrangement of claim 12 further including:
a main microprocessor;
a shared RAM operable for storing commands and messages generated at the main microprocessor; and
a secondary microprocessor operable to access the RAM and to control the simplex lines and/or the data bus so that the circuit arrangement performs in accordance with commands being issued from said microprocessors.

15. In a loop communications network having a protocol for exchanging packets of information between terminals on said loop with said protocol having a predetermined sequence of bits for identifying special characters within said packets of information; an improved single chip adapter for connecting the terminals to the loop communications network comprising:
a read data register for receiving data from said loop communications network;
a write data register for receiving data from one of the terminals;
a plurality of control registers for providing a command/status interface between the single chip adapter and said one of the terminals;
a plurality of data signal lines connected to said one of the terminals;
a plurality of control signal lines connected to said one of the terminals;
a decoding combinatorial circuit means interconnecting the signal lines with the control registers and the read and write data registers; said decoding combinatorial circuit means being operable for monitoring the signal lines and for selecting one of the control registers identified by signals on said lines;
a first circuit means coupled to the read data register and when activated causing data to be transmitted from the loop into said read data register;
a second circuit means coupled to the write data register and when activated causing data to be transmitted from the write data register to the loop; and
third circuit means for monitoring said one of the control register and using the electrical states of selected bits within said register for generating control signals for activating the first and/or the second circuit means.

16. The single chip adapter of claim 15 further including a serializer circuit coupling the write data register to the loop; and
a deserializer circuit coupling the loop to the read data register.

17. The single chip adapter of claim 15 further including a monitor circuit means coupling the second circuit means to the loop; said monitor circuit means being responsive to a signal generated from the third circuit means and operable for extracting a data stream from the loop and returning said data stream on the loop without affecting the electrical characteristics of the data.

18. The single chip adapter of claim 15 wherein the first circuit means further includes a decoder circuit for intercepting packets of information flowing from the loop into the adapter and as predetermined sequence of bits representative of special characters are being decoded setting control bits with another of the control registers.

19. The single chip adapter set forth in claim 18 further including an interrupt logic circuit means being responsive to the setting of control bits within said another of the control registers and operable for generating an interrupt signal on an interrupt line emanating from said single chip adapter.

20. The single chip adapter set forth in claim 17 wherein the monitor circuit means includes a first D-type data latch for receiving data from the loop;
- a first combinatorial logic circuit means connected to the D-type data latch, said first combinatorial logic circuit means responsive to the electrical state of bits within the control registers and operable to select and pass data from the first D-type latch or data from said one of the terminals;
- a second D-type latch for receiving data from the first combinatorial logic circuit means; and
- a second combinatorial logic circuit means connected to the second D-type latch and controlled by bit settings in the control registers to pass data outputted from the second D-type latch onto the loop or to pass recently received loop data back onto the loop.

* * * * *